(No Model.)
E. WESTON.
ELECTRICAL MEASURING INSTRUMENT.
No. 490,700. Patented Jan. 31, 1893.
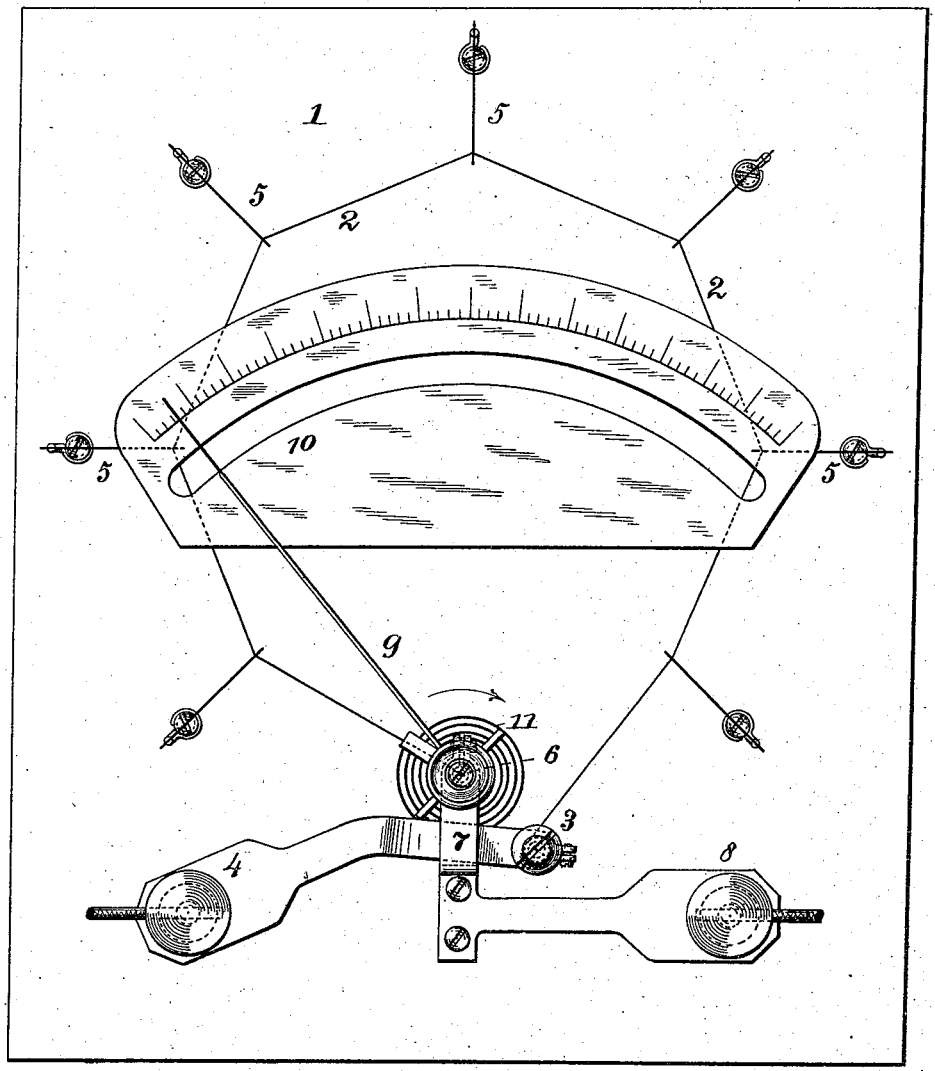
WITNESSES:
Chas. Hanimann
N. R. Moller
INVENTOR
Edward Weston
BY
Park Benjamin
his ATTORNEY.

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 490,700, dated January 31, 1893.

Application filed March 29, 1892. Serial No. 426,882. (No model.)

*To all whom it may concern:*

Be it known that I, EDWARD WESTON, of Newark, Essex county, New Jersey, have invented a new and useful Improvement in Electrical Measuring-Instruments, of which the following is a specification.

My invention relates to that type of electrical measuring instruments in which a body, usually in the form of a fine wire or filament, is expanded by the action of the current to be measured upon it, and the extent of expansion of said body being indicated upon a suitable scale, serves as a measure of the current.

My invention consists more particularly in a support for the expansible body, which support is so made that it has the same coefficient of expansion as the said expansible body; so that any variation in dimension of said expansible body, caused by exterior influences, such as changes in atmospheric temperature, will be compensated for by the like change in dimension of the support due to the same cause.

In another application for Letters Patent for an electrical measuring instrument, filed by me January 14, 1892, Serial No. 418,101, I have fully described an apparatus of the type above-mentioned; and I have stated that the base of that instrument may be made of metal, and of such form and dimensions that its expansion due to atmospheric changes "shall correspond to that of the wire and thus render the instrument independent of such variation."

In my present application, I show the same instrument as set forth in my application aforesaid, but simply here as an example of the general class of apparatus to which the invention herein particularly described is to be applied. It is to be understood, therefore, that I do not limit the application of my invention to this particular instrument, on the one hand, nor do I herein claim any structural features of said instrument which constitute the subject-matter of the claims of my aforesaid pending application thereunto particularly relating.

The accompanying drawing shows a plan view of my said instrument, and I here describe only so much thereof as is necessary for the comprehension of my present invention.

1 is the base or support.

2 is a wire or thin filament of metal, or alloy preferably, and is of one one-thousandth of an inch in diameter, or even less. This wire is fastened at one end to a fixed support 3, which is electrically connected with the binding post 4. It passes through notches on the ends of spring arms 5, and finally is fastened to a rotary shaft 6, which is received in a bracket, 7. The bracket 7 connects with the binding post 8. On the shaft 6 is a spring 11 which exerts a slight tension on the wire 2. The springs 5 furnish what is practically a frictionless support for the wire. On the shaft 6 is an index finger 9, which moves over a suitable scale 10.

The operation of the instrument is as follows:—When a current enters the binding post 4, it traverses the wire 2, and thence passes to the binding post 8. The wire, becoming elongated to an extent bearing a relation to the difference in potential between the terminals of the instrument, elongates, and, as a consequence, the spiral spring 11, acting upon the shaft 6, causes a rotation of said shaft and a consequent movement of the index finger over the scale. This scale is marked in suitable units.

It will be obvious that, inasmuch as the wire 2 is supported by the base 1, that base and wire are both affected by changes in the temperature of the surrounding atmosphere, and that consequently, if the coefficient of expansion of the material of which the base is composed be made the same as that of the wire, then any variation in length of the wire due to changes in atmospheric temperature will be compensated for by an equal variation in dimensions of the base or support.

I have determined, by actual experiment, that the coefficient of expansion of an alloy approaches very nearly to the mean of the coefficient of expansion of the metals which form the ingredients of that alloy. In most of the common alloys, I find this law to hold good. Clearly then, if I select two metals, one having a large, and the other a small, coefficient of expansion, I can, by proper proportioning of them as ingredients in an alloy, make a metal of exactly the same coefficient of expansion as some given metal or alloy which falls within the limits of the mean of the coefficients of expansion of the two metals chosen; so that, having an expansible wire of certain known constitution, I can, by availing myself of this law, easily produce a support therefor which shall have the same coefficient of expansion. Now, considering the practical requirements of an electrical measuring instrument, it will be plain that for economical reasons the metals which can enter into the alloy forming the support are necessarily few. Alloys of platinum and silver, or even platinum and copper, are too coarse for it; but this objection does not apply to alloys composed of copper and nickel, or copper and cobalt, or copper and iron, or copper, nickel and iron, or copper, nickel and cobalt, or copper, nickel and manganese; and by taking suitable proportions of these metals to correspond to the mean of the coefficient of expansion of the metals used in the wire, I can, from any of these alloys, make a compensating support.

Suppose that I employ in practice a wire composed of an alloy of palladium, platinum and silver. This alloy has many advantages. If the palladium be present in moderately large quantity, it is very homogeneous. It is inoxidizable. It has great tensile strength, and it is better than an alloy of silver and platinum, because, as is well known, those metals do not alloy together perfectly, and the platinum tends to separate at the bottom of the crucible, while it is neither homogeneous, nor has it very tensile strength. But, as I have stated, as I need wires of one one-thousandth of an inch in diameter, and even less, strength and ductility are qualities of great importance.

I have found that an alloy composed of fifteen parts palladium, twenty parts platinum and sixty-five parts of silver, answers excellently for the conducting wire; and I will use it here as an example to show how I apply the law of proportions above set forth in making the support for that wire. The coefficient of expansion of the above alloy is about .00001606. To make this support, I take copper, which has a coefficient of expansion of .00001718, and nickel, the coefficient of expansion of which is .00001279. By compounding together 8 4.5 per cent. of copper and 15.5 per cent. of nickel, the resulting alloy will have the same coefficient of expansion as my wire; namely, .00001606. If in the wire more silver is used, or more palladium and less platinum, so as to give a high coefficient of expansion, then the proportion of nickel in the support alloy must be reduced in accordance with the law stated; or, in place of nickel, some other metal having a higher coefficient of expansion may be used in combination with copper, whose coefficient of expansion must, of course, be less than that of copper if the coefficient of expansion of the alloy is less than that of copper. In any event, the amount of other metal must be proportioned correspondingly to the above law. I may substitute cobalt for nickel, slightly changing the amount of cobalt present to allow for its slightly lower coefficient of expansion; or, since iron has nearly the same coefficient of expansion as nickel, that metal may be used partly or entirely to replace nickel.

It is to be understood that I do not limit myself to any particular mechanical relation of the support to the wire supported. Thus the wire may be connected to the support at both ends, or at one end. The support may be a simple straight rod or plate to which the wire is attached, or it may be an arc of which the wire forms a chord. In other words, the shape of the support and the mode of connection of the wire to it, and, generally, the relation of wire and support mechanically considered, are entirely immaterial, so long as the co-action of the wire and support be such that the coefficient of expansion of the support allows it to expand or contract correspondingly to the wire.

One great advantage of my invention is that I may use an alloy especially adapted to the purposes of a wire, and an alloy especially adapted to the purposes of a support. The former may have all the qualities of inoxidizability, ductility, tensile strength and high resistance, as may be needed. The other need have none of these qualities; and yet, the two alloys may be on a par in that both have the same coefficient of expansion; and this, in practice and in view of the relative uses of the two substances, is the only feature in which parity need exist.

I claim:—

1. The combination in a measuring instrument of a body of material variable in dimension under temperature changes, a means of indicating extent of such variation, and a support for said body constructed of material different from, but having the same coefficient of expansion as, said body.

2. The combination in a measuring instrument of a body of material variable in dimension under temperature changes, a means of indicating extent of such variation, and a support for said body constructed of two or more substances combined to produce a homogeneous compound substance having a coefficient of expansion the same as that of said body.

3. The combination in a measuring instrument of a body of material variable in dimension under temperature changes, a means of indicating extent of such variation, and a support for said body constructed of two or more metals selected and combined to produce an alloy having a coefficient of expansion the same as that of said body.

4. The combination in a measuring instrument of a wire or filament of metal, an index controlled by the elongation and contraction of said wire, and a support for said wire constructed of an alloy having the same coefficient of expansion as said wire.

5. In an electrical measuring instrument containing an expansible wire or filament in circuit and an index controlled by the expansion of said wire, a support for said wire constructed of an alloy having the same coefficient of expansion as said wire.

6. In an electrical measuring instrument containing a wire or filament of a palladium, platinum and silver alloy in circuit and an index controlled by the expansion of said wire, a support for said wire constructed of an alloy of copper and nickel combined substantially and in proportion as specified.

7. In an electrical measuring instrument, a fine wire or filament in loop form, a means of indicating the extent of elongation of said wire due to temperature changes acting thereon, a series of arms supporting said loop, and a support for said arms constructed of a material having the same coefficient of expansion as said wire.

EDWARD WESTON.

Witnesses:
H. R. MOLLER,
M. BOSCH.